(12) United States Patent
Poulain et al.

(10) Patent No.: US 8,362,869 B2
(45) Date of Patent: Jan. 29, 2013

(54) STABLE THERMISTOR BASED ON A COMPOSITION COMPRISING RARE EARTH METAL

(75) Inventors: Véronique Poulain, Mons (BE); Sophie Schuurman, Céroux-Mousty (BE); André Lannoo, Linden (BE); Frans F. Westendorp, Epse (NL)

(73) Assignee: Vishay Resistors Belgium BVBA, Brussels (Evere) (BE)

( * ) Notice: Subject to any disclaimer, the term of this patent is extended or adjusted under 35 U.S.C. 154(b) by 279 days.

(21) Appl. No.: 12/808,635

(22) PCT Filed: Dec. 19, 2008

(86) PCT No.: PCT/EP2008/010944
§ 371 (c)(1),
(2), (4) Date: Oct. 7, 2010

(87) PCT Pub. No.: WO2009/080319
PCT Pub. Date: Jul. 2, 2009

(65) Prior Publication Data
US 2011/0027587 A1  Feb. 3, 2011

(30) Foreign Application Priority Data
Dec. 21, 2007  (EP) ..................... 07025041

(51) Int. Cl.
*H01C 7/06* (2006.01)
*C04B 35/50* (2006.01)
*C04B 35/505* (2006.01)
*C01F 17/00* (2006.01)
*C01G 1/02* (2006.01)

(52) U.S. Cl. ............... 338/22 R; 338/22 SD; 338/52; 338/100; 338/223; 338/224; 423/21.1; 423/138; 423/155; 423/593.1; 423/594.4; 423/594.6; 423/596; 423/599; 501/126; 501/132; 501/152

(58) Field of Classification Search ............... 338/22 R, 338/22 SD, 52, 100, 223, 224; 423/21.1, 423/138, 155, 594.4, 594.6, 593.1, 596, 599; 501/126, 132, 152
See application file for complete search history.

(56) References Cited

U.S. PATENT DOCUMENTS

| | | | |
|---|---|---|---|
| 2,700,720 A * | 1/1955 | Torok | 338/22 R |
| 4,162,631 A * | 7/1979 | Logothetis et al. | 338/28 |
| 4,231,902 A * | 11/1980 | Yu | 252/519.5 |
| 5,568,116 A * | 10/1996 | Iwaya et al. | 338/22 SD |

(Continued)

FOREIGN PATENT DOCUMENTS

| DE | 101 50 248 A1 | 6/2002 |
|---|---|---|
| EP | 0 626 356 A1 | 11/1994 |

(Continued)

*Primary Examiner* — Hoa (Holly) Le
(74) *Attorney, Agent, or Firm* — Kilpatrick Townsend & Stockton LLP

(57) ABSTRACT

A thermistor based on a composition having the general formula (I): $Re_{2-x-y}Cr_aMn_bM_cE_yO_z$ wherein Re is a rare earth metal or a mixture of two or more rare earth metals, M is a metal selected from the group consisting of nickel, cobalt, copper, magnesium and mixtures thereof, E is a metal selected from the group consisting of calcium, strontium, barium and mixtures thereof, x is the sum of a+b+c and is a number between 0.1 and 1, and the relative ratio of the molar fractions a, b and c is in an area bounded by points A, B, C and D in a ternary diagram, wherein point A is, if y<0.006, at (Cr=0.00, Mn=0.93+10−y, M=0.07−10−y), and, if y≧0.006, at (Cr=0−00, Mn=0.99, M=0.01), point B is, if y<0.006, at (Cr=0.83, Mn=0.10+10−y, M=0.07−10−y), and, if y≧0.006, at (Cr=0.83, Mn=0.16, M=0.01), point C is at (Cr=0.50, Mn=0.10, M=0.40) and point D is at (Cr=0.00, Mn=0.51, M=0.49), y is a number between 0 and 0.5−x, and z is a number between 2.5 and 3.5.

54 Claims, 3 Drawing Sheets

U.S. PATENT DOCUMENTS

| | | |
|---|---|---|
| 5,637,543 A | 6/1997 | Iwaya et al. |
| 5,955,937 A * | 9/1999 | Groen ........................ 338/22 SD |
| 6,222,262 B1 * | 4/2001 | Ueno et al. ..................... 257/703 |
| 6,261,480 B1 * | 7/2001 | Ogata et al. ................. 252/520.5 |
| 6,358,875 B1 * | 3/2002 | Kawase et al. ................ 501/152 |
| 6,878,304 B2 * | 4/2005 | Ogata et al. ............... 252/62.3 R |
| 7,556,745 B2 * | 7/2009 | Chosokabe et al. .......... 252/500 |

FOREIGN PATENT DOCUMENTS

| | | |
|---|---|---|
| EP | 0 789 366 A2 | 8/1997 |
| EP | 0 866 472 A2 | 9/1998 |
| EP | 0 737 655 B1 | 3/1999 |
| EP | 1 179 825 A2 | 2/2002 |
| EP | 1 043 288 B1 | 10/2003 |

* cited by examiner

STABLE THERMISTOR BASED ON A COMPOSITION COMPRISING RARE EARTH METAL

CROSS-REFERENCES TO RELATED APPLICATIONS

This application is a National Stage of International Application No. PCT/EP2008/010944 filed Dec. 19, 2008, and which claims the benefit of European Patent Application No. 07025041.0, filed Dec. 21, 2007, the disclosures of which are incorporated herein by reference.

The present invention relates to a stable thermistor.

Thermistors are used in various applications, such as in current limiting devices for circuit protection, in heating elements of temperature controlled ovens and particularly in resistance thermometers. Thermistors are classified in positive temperature coefficient (PTC) thermistors and negative temperature coefficient (NTC) thermistors. While the resistance increases for PTC thermistors with increasing temperature, NTC thermistors are characterized in that their resistance decreases with increasing temperature. Presently, NTC thermistors are primarily applied for temperature measurements up to 500° C., whereas PTC thermistors are especially used for temperature measurements up to 800° C. However, there is an increasing demand for temperature sensors capable of monitoring high temperatures above 800° C. with an excellent accuracy, such as temperature sensors applied in the exhaust systems of diesel cars. However, the known thermistors are not sufficiently suitable for this purpose.

EP 0 866 472 A2 discloses a thermistor element comprising a mixed sintered body $M^1M^2O_3 \cdot Y_2O_3$ of a composition $M^1M^2O_3$ and $Y_2O_3$, wherein $M^1$ is at least one element selected from the elements of the groups IIA and IIIA excluding La in the Periodic Table and $M^2$ is at least one element selected from the elements of the groups IIB, IIIB, IVA, VA, VIA, VIIA and VIII, such as $Y(Cr_{0.5}Mn_{0.5})O_3 \cdot Y_2O_3$ and $Y(CrMnTi)O_3 \cdot Y_2O_3$. This thermistor element shall be able to detect a temperature between room temperature and 1,000° C. with a temperature accuracy between 20 and 30° C.

EP 1 179 825 A2 relates to a reduction resistant thermistor comprised of a sintered body of a metal oxide obtained by shaping and firing a thermistor material including the metal oxide, having a mean particle size of the thermistor material of less than 1.0 μm, and having a mean sintered particle size of the sintered body of the metal oxide of 3 μm to 20 μm. The mixed sintered body is composed of $(M^1M^2)O_3 \cdot AO_x$ of a composite oxide expressed by $(M^1M^2)O_3$ and a metal oxide expressed by $AO_x$, wherein, in the composite oxide $(M^1M^2)O_3$, $M^1$ is at least one type of element selected from elements of Group IIA of the Periodic Table and Group IIIA except for La and $M^2$ is at least one type of element selected from elements of Group IIIB, Group IVA, Group VA, Group VIA, Group VIIA and Group VIII of the Periodic Table, and, wherein the metal oxide $AO_x$ has a melting point of at least 1,400° C., with the resistance of the $AO_x$ alone in the shape of the thermistor at 1,000° C. being at least 1,000Ω. This thermistor shall be stable against reduction even when the thermistor is exposed to a reducing atmosphere, which shall be due to the fact that the mean sintered particle size of the sintered body of the metal oxide lies between 3 μm and 20 μm.

However, the stability of the aforementioned thermistors is not sufficient, in particular if they are used at comparatively high temperatures, because the resistance value and hence the calculated temperature varies with the oxidation state of the ceramic material. The oxidation state of the ceramic can change even if the oxygen content of the ambient gas is constant, because the affinity of oxides for oxygen is strongly dependent on the temperature. Even if the thermistor disclosed in EP 1 179 825 A2 shall be reduction resistant due to the adjustment of a specific mean sintered particle size, the oxidation change can not be completely excluded for this thermistor.

The object underlying the present invention is therefore to provide a thermistor having an improved stability.

According to the present invention this object is satisfied by providing a thermistor based on a composition having the general formula (I):

$$Re_{2-x-y}Cr_aMn_bM_cE_yO_z \qquad (I)$$

wherein

Re is a rare earth metal or a mixture of two or more rare earth metals,

M is a metal selected from the group consisting of nickel, cobalt, copper, magnesium and mixtures thereof, E is a metal selected from the group consisting of calcium, strontium, barium and mixtures thereof, x is the sum of a+b+c and is a number between 0.1 and 1, and the relative ratio of the molar fractions a, b and c is in an area bounded by points A, B, C and D in a ternary diagram, wherein point A is, if y<0.006, at (Cr=0.00, Mn=0.93+10·y, M=0.07−10·y), and,
if y≧0.006, at (Cr=0.00, Mn=0.99, M=0.01),
point B is, if y≦0.006, at (Cr=0.83, Mn=0.10+10·y, M=0.07−10·y), and,
if y≧0.006, at (Cr=0.83, Mn=0.16, M=0.01),
point C is at (Cr=0.50, Mn=0.10, M=0.40) and
point D is at (Cr=0.00, Mn=0.51, M=0.49), y is a number between 0 and 0.5·x, and z is a number between 2.5 and 3.5.

A thermistor based on a composition having the general formula (I) means according to the present patent application that the thermistor at least essentially consists of a respective composition, i.e. that the thermistor comprises at least 60% by weight, preferably at least 80% by weight, more preferably at least 90% by weight, even more preferably at least 95% by weight, still more preferably at least 99% by weight and most preferably 100% by weight of the composition having the general formula (I).

This solution is based on the surprising finding that by adding a metal selected from the group consisting of nickel, cobalt, copper, magnesium and mixtures thereof and, optionally, a metal selected from the group consisting of calcium, strontium, barium and mixtures thereof into the composition of a thermistor, the stability of the composition can be significantly improved. Thus, the properties of the thermistor according to the present invention are completely independent from the oxidation treatment, which leads to a considerable improvement of the accuracy of the derived temperature sensors. This effect is essentially independent from the particle size of the composition.

In the above identified formula, a, b and c are the molar fractions for the chromium (Cr), the manganese (Mn) and the at least one metal (M) selected from the group consisting of nickel, cobalt, copper, magnesium and mixtures thereof, respectively, wherein the sum of a, b and c is x. Because the relative ratio of the molar fractions a, b and c is defined by the above points A, B, C and D in a ternary diagram, the absolute values of the respective molar fractions are the product of the respective relative ratios with x. Accordingly, e.g. the absolute value of a is: a=(relative ratio of a)·x. Or in other words: If the relative ratio of the aforementioned elements is Cr:Mn:M=α:β:γ, with α+β+γ being 1, then a=x·α, b=x·β and c=x·γ.

Figure 1:
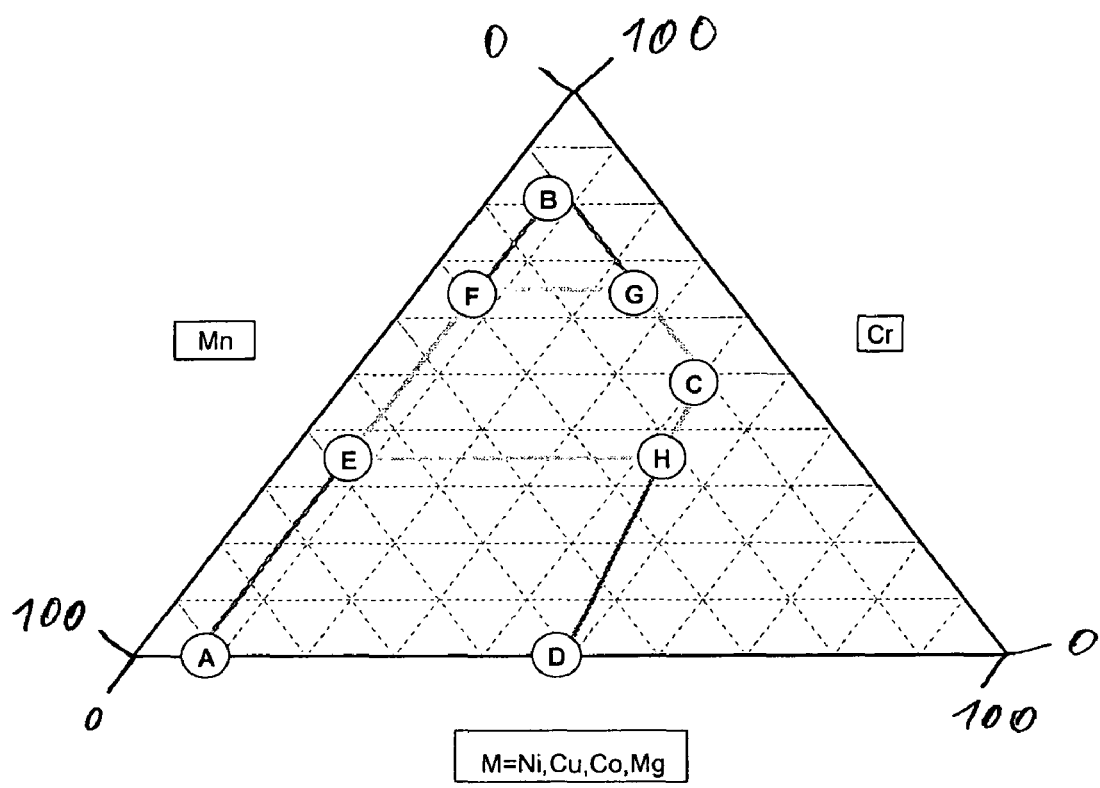
FIG. 1 shows a ternary diagram illustrating the relative ratio of the molar fractions a, b, c for the chromium, the manganese and the at least one metal M, respectively, according to an embodiment in which the parameter y=0.
Figure 2:
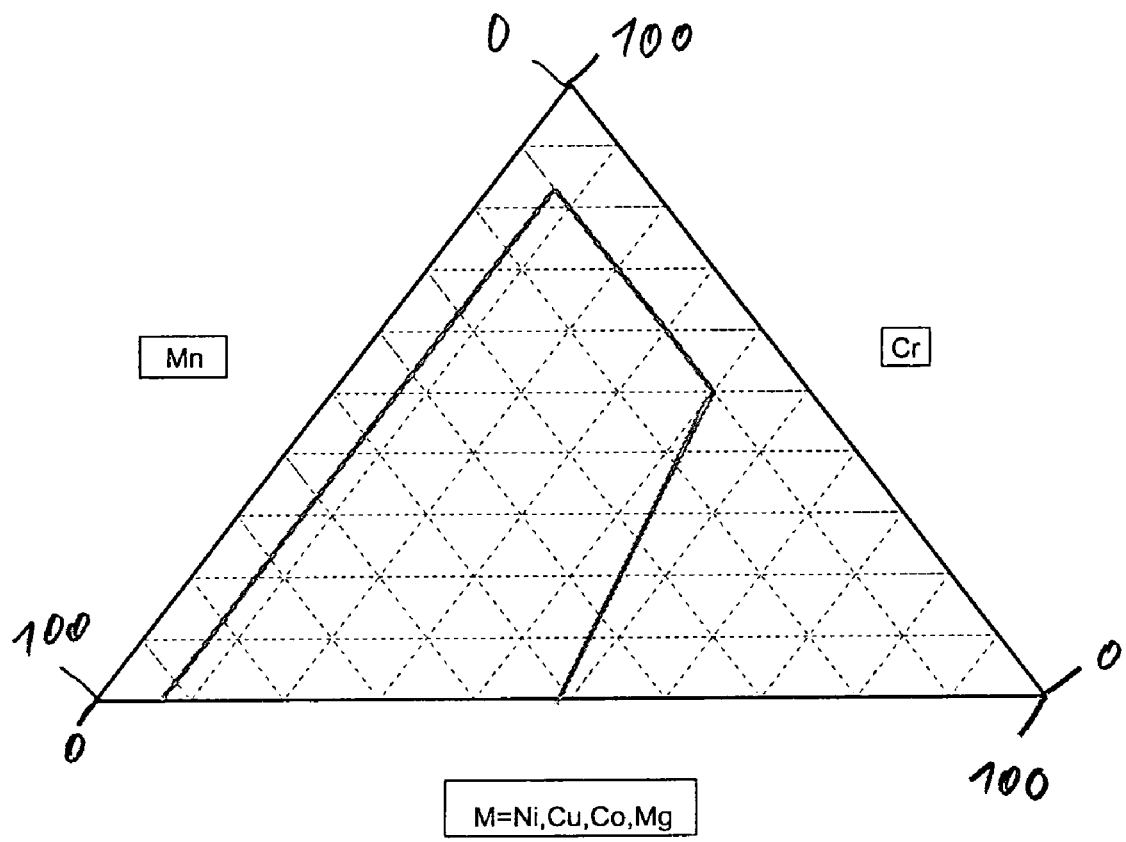
FIG. 2 shows the ternary diagram according to FIG. 1 with the lines A-B, B-C, C-D and D-A highlighted.

With the term that the relative ratio of the molar fractions a, b and c is in an area bounded by points A, B, C and D in a ternary diagram is meant that the respective relative values of a, b and c lie in an area of the ternary diagram, which is bordered by the lines A-B, B-C, C-D and D-A. The respective ternary diagram for the components Cr, Mn and M (Ni, Co, Cu, Mg) with the points A, B, C and D for the case that y=0 is illustrated in FIG. 1. The respective ternary diagram with the area bordered by the lines A-B, B-C, C-D and D-A highlighted is represented in FIG. 2. In this Figure the line AB is drawn for the case that the parameter y in formula (I) is zero. For larger values of y, the line AB moves according to the formula (I): it remains parallel to the line for y=0, but moves towards the edge of the triangle (M=0).

According to a preferred embodiment of the present invention, the relative ratio of the molar fractions a, b and c lies in an area bounded by points E, F, G, C and H in a ternary diagram, wherein point E is, if y<0.006, at (Cr=0.35, Mn=0.58+10·y, M=0.07−10·y), and,
    if y≧0.006, at (Cr=0.35, Mn=0.64, M=0.01),
point F is, if y<0.006, at (Cr=0.65, Mn=0.28+10·y, M=0.07−10·y), and,
    if y≧0.006, at (Cr=0.65, Mn=0.34, M=0.01),
point G is at (Cr=0.65, Mn=0.10, M=0.25),
point C is at (Cr=0.50, Mn=0.10, M=0.40) and
point H is at (Cr=0.35, Mn=0.22, M=0.43).

Figure 3:
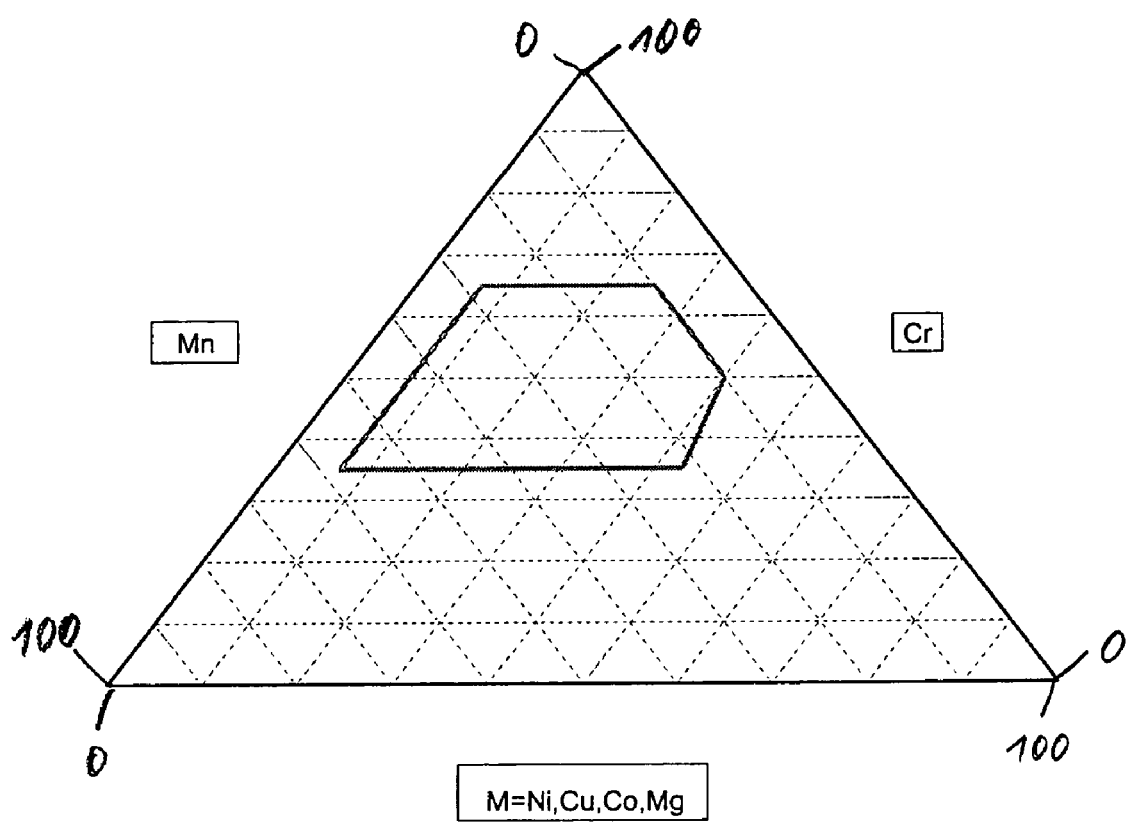
FIG. 3 shows the ternary diagram according to FIG. 1 with the lines E-F, F-G, G-C, C-H and H-E highlighted.

The respective ternary diagram for the components Cr, Mn and M (Ni, Co, Cu, Mg) with the points E, F, G, C and H for the case that y=0 is illustrated in FIG. 1, while the respective ternary diagram with the area bordered by the lines E-F, F-G, G-C, C-H and H-E highlighted is represented in FIG. 3. In this Figure the line AB is drawn for the case that the parameter y in formula (I) is zero. For larger values of y, the line AB moves according to the formula (I): it remains parallel to the line for y=0, but moves towards the edge of the triangle (M=0).

According to the present invention, the composition of the thermistor, which is in fact a ceramic composition, may contain as component Re in formula (I) any rare earth metal or any arbitrary mixture of two or more rare earth metals. Rare earth metals are according to the present invention scandium (Sc), yttrium (Y) and all fifteen lanthanides, i.e. lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu), notwithstanding that promethium is considered in some literature to be not a rare earth metal, because it is not naturally occurring on the earth.

Preferably, component Re in formula (I) is selected from the group consisting of Y, Tb, Dy, Er, La and combinations thereof. Particularly, good results are obtained if component Re in formula (I) is Y, Dy, Er, La, a mixture of Y and Dy or a mixture of Y and Tb. Most preferably, component Re in formula (I) is a mixture of Y and Tb.

If component Re in formula (I) consists of two or even more different rare earth metals, these can be mixed in any arbitrary ratio with each other. By the way of example, if component Re in formula (I) is a mixture of Y and Tb, the ratio of the molar fraction of Y to the molar fraction of Tb may be between 5:1 and 1:1 and preferably between 4.5:1 and 3:1. Particularly, good results are for instance obtained if the ratio of the molar fraction of Y to the molar fraction of Tb amounts to about 3.5:1.

Basically, x may be any arbitrary value between 0.1 and 1.0. Preferably, x is an arbitrary number between 0.2 and 0.6, more preferably between 0.3 and 0.5 and even more preferably between 0.35 and 0.45. Particular good results are for instance obtained, if x amounts to about 0.4.

The relative ratio of the molar fractions a, b and c is preferably a=0.4–0.6:b=0.23–0.43:c=0.08–0.28, more preferably a=0.45–0.55:b=0.28–0.38:c=0.12–0.22 and most preferably a=0.5:b=0.33:c=0.17.

Basically, the component M in formula (I) can be any metal selected from the group consisting of nickel (Ni), cobalt (Co), copper (Cu), magnesium (Mg) and mixtures thereof, that is for example a mixture of nickel and cobalt, a mixture of copper and magnesium or a mixture of nickel, cobalt and copper. Preferably, component M in formula (I) is only one metal selected from the group consisting of nickel, cobalt, copper and magnesium. Good results are particularly obtained, if component M in formula (I) is nickel.

All of the aforementioned parameters, that is the molar fractions a, b and c as well as the values x, y and z, can be arbitrarily combined as long as the single numeric values fall within the respective numeric value ranges mentioned above. Preferably, component Re is Y, Dy, Er, La, a mixture of Y and Dy or a mixture of Y and Tb and M is Ni.

In contrast to the components Re, Cr, Mn, M and E, oxygen is not deliberately added to the composition, but is adjusted by the atmosphere during the heat treatment following the law of stoichiometry. According to the stoichiometry, the ratio (Re, Cr, Mn, M plus E):O is 2:3, with 2 and 3 being exact integers. However, the law of stoichiometry is in practice not always fulfilled so that actually the oxygen content in the compound according to the general formula (I) may be somewhat larger or lower than 3. Accordingly, z may be a number between 2.5 and 3.5. Preferably, z is a number between 2.75 and 3.25, more preferably between 2.90 and 3.10, even more preferably between 2.95 and 3.05, even more preferably between 2.97 and 3.03, even more preferably between 2.99 and 3.01 and most preferably of 3.00.

Basically, y may be any arbitrary value between 0 and 0.5·x.

According to a first particular preferred embodiment of the present invention, y is an arbitrary number larger than zero, i.e. the composition contains a metal E (Ca, Sr, Ba). Preferably, y is an arbitrary number between 0.01 and 0.2, more preferably between 0.02 and 0.1, even more preferably between 0.03 and 0.06 and most preferably of 0.05, i.e. the composition contains a respective amount of an element selected from the group consisting of calcium, strontium, barium and mixtures thereof.

In this embodiment, i.e. if y is larger than zero, E may be calcium, strontium, barium or any arbitrary combination of two of the aforementioned elements or even a combination of calcium, strontium and barium. Particularly good results are obtained, if E is calcium.

Furthermore, it is preferred that c is at least 0.01 in this embodiment, wherein the metal M is preferably nickel, cobalt or copper.

The component Re is in this embodiment preferably Er.

Particularly good results are achieved in this embodiment, if the composition has the general formula (II):

$$Er_iCa_jCr_kMn_lNi_sO_m \quad (II),$$

wherein
i is a number between 1.4 and 1.6,
j is a number between 0.02 and 0.2,
k is a number between 0.15 and 0.25, preferably of 0.2,
l is a number between 0.14 and 0.24, preferably of 0.19,
s is at least 0.01 and
m is 3.00.

A particular preferred composition falling under the general formula (II) is a composition according to the subsequent formula (III):

$$Er_{1.55}Ca_{0.05}Cr_{0.2}Mn_{0.19}Ni_{0.01}O_3 \quad (III).$$

Furthermore, particular preferred examples of the composition are compounds equal to those of the general formulae (II) and (III) in which Ni is replaced by copper or cobalt.

According to a second particular preferred embodiment of the present invention, y in the composition according to the general formula (I) is 0, i.e. the respective composition does not contain an element selected from the group consisting of calcium, strontium, barium and mixtures thereof.

Preferably, the thermistor according to the second particular preferred embodiment of the present invention is based on a composition according to the general formula (IV):

$$Re_{1.6}Cr_{0.2}Mn_bNi_cO_3 \quad (IV),$$

wherein Re is Y, Dy, Er, La, a mixture of Y and Dy or a mixture of Y and Tb, b is a number between 0.12 and 0.14 and c is a number between 0.06 and 0.07.

Also in this embodiment, component Re in formula (IV) is preferably a mixture of Y and Tb.

A preferred composition falling under the general formula (IV) is a composition according to the subsequent general formula (V):

$$Y_nTb_pCr_{0.2}Mn_bNi_cO_3 \quad (V)$$

wherein n is the molar fraction of Y and is a number between 1.2 and 1.3, p is the molar fraction of Tb and is a number between 0.3 and 0.4, b is a number between 0.12 and 0.14 and c is a number between 0.06 and 0.07.

A particular preferred composition falling under the general formula (VI) is a composition according to the subsequent formula (VI):

$$Y_{1.24}Tb_{0.36}Cr_{0.2}Mn_{0.132}Ni_{0.068}O_3 \quad (VI).$$

The average (sintered) particle size of the composition of the thermistor may be less than 3 μm and is preferably less than 2 μm and more preferably between 1.0 and 1.9 μm.

Furthermore, it is preferred that the ceramic composition of the thermistor comprises a corundum phase and a perovskite phase.

Basically, the present invention is not limited with regard to the ratio of the molar fraction of the corundum phase to the molar fraction of the perovskite phase. By the way of example, the molar fraction of the corundum phase may be, based on the total composition, that is based on the sum of the molar fraction of the corundum phase and the molar fraction of the perovskite phase (which is 1), between 0.4 and 0.8 and more preferably between 0.5 and 0.7, so that the molar fraction of the perovskite phase is preferably between 0.2 and 0.6 and more preferably between 0.3 and 0.5. Particular good results are obtained, if the molar fraction of the corundum phase is 0.6 and the molar fraction of the perovskite phase amounts to 0.4.

The average (sintered) particle size of the composition of the corundum phase may be less than 3 μm and is preferably less than 2 μm and more preferably between 1.5 and 1.9 μm.

The average (sintered) particle size of the composition of the perovskite phase may be less than 3 μm and is preferably less than 2 μm and more preferably between 1.0 and 1.5 μm.

According to a further preferred embodiment of the present invention, the resistivity of the thermistor at 25° C. is between 2 and 2.000 kΩ·mm, more preferably between 500 and 1.500 kΩ·mm and even more preferably between 1.000 and 1.200 kΩ·mm.

Preferably, the $B_{25/85}$ value of the thermistor is between 2,000 and 4,000 K.

Furthermore, it is preferred that the resistivity of the thermistor at 900° C. is between 0.002 and 0.040 kΩ·m.

Particular good results are achieved, if the electrical resistance of the thermistor at 25° C. is between 0.9 and 1.1 MΩ and/or if the electrical resistance of the thermistor at 900° C. is less than 40Ω.

The thermistor according to the present invention is preferably a NTC thermistor.

Furthermore, the present patent application relates to a method for producing a thermistor based on a composition with the general formula (I), preferably a thermistor based on a composition with the general formula (II), (IV) or (V) and more preferably a thermistor based on a composition with the general formula (III) or (VI).

According to the present invention, this method comprises the steps of:
i) mixing at least one rare earth metal oxide with manganese oxide and with at least one metal oxide selected from the group consisting of nickel oxide, cobalt oxide, copper oxide and magnesium oxide, and, optionally with at least one compound selected from the group consisting of calcium carbonate, strontium carbonate, barium carbonate and mixtures thereof, and/or, optionally, with chromium oxide,
ii) milling the mixture obtained in step i),
iii) forming the mixture obtained in step ii) into an article having a desired shape and
iv) sintering the article.

Subsequently, the present invention is further described by means of non limiting examples.

EXAMPLE 1 AND COMPARATIVE EXAMPLE 1

A series of thermistors was made by the following procedure based on the composition $Y_{1.24}Tb_{0.36}Cr_{0.2}Mn_{0.2}O_3$, in which Mn was progressively replaced by Ni.

The raw materials were weighed in batches of 100 gram. These batches were milled for 48 hours in small laboratory ball mills, using 200 grams of isopropanol. The milling media was 100 gram of 2 mm YTZ balls. After milling the slurry was separated from the balls and dried. The powder was then granulated with 2% PVB as binder and pressed into pellets of 15 mm diameter and 2 mm thickness. The resulting specimens were painted with platinum paste and sintered for 1 hour at 1,500° C. in air. Afterwards, the $\rho_{25}$ was measured, before the samples were then subjected to an ageing treatment of 16 hours at 900° C. in air. Then the samples were again measured and the change in $\rho_{25}$ was calculated. The relative change in ρ25 with respect to the as fired value is referred to as drift.

All samples provided a mean particle size below 2 μm.

The constitution of the single samples as well as their relative change in $\rho_{25}$ with respect to the as fired value, i.e. their drift, is summarized for the single compositions in Table 1.

TABLE 1

| Example | Composition | Drift |
|---|---|---|
| Comparative Example 1 | $Y_{1.24}Tb_{0.36}Cr_{0.2}Mn_{0.2}O_3$ | −37.3% |
| 1-1 | $Y_{1.24}Tb_{0.36}Cr_{0.2}Mn_{0.188}Ni_{0.012}O_3$ | −5.4% |
| 1-2 | $Y_{1.24}Tb_{0.36}Cr_{0.2}Mn_{0.176}Ni_{0.024}O_3$ | −1.2% |
| 1-3 | $Y_{1.24}Tb_{0.36}Cr_{0.2}Mn_{0.152}Ni_{0.048}O_3$ | 0.3% |
| 1-4 | $Y_{1.24}Tb_{0.36}Cr_{0.2}Mn_{0.145}Ni_{0.055}O_3$ | 0.2% |
| 1-5 | $Y_{1.24}Tb_{0.36}Cr_{0.2}Mn_{0.14}Ni_{0.06}O_3$ | 0.6% |
| 1-6 | $Y_{1.24}Tb_{0.36}Cr_{0.2}Mn_{0.135}Ni_{0.065}O_3$ | 1.0% |
| 1-7 | $Y_{1.24}Tb_{0.36}Cr_{0.2}Mn_{0.13}Ni_{0.07}O_3$ | 0.7% |
| 1-8 | $Y_{1.24}Tb_{0.36}Cr_{0.2}Mn_{0.125}Ni_{0.075}O_3$ | 0.4% |
| 1-9 | $Y_{1.24}Tb_{0.36}Cr_{0.2}Mn_{0.12}Ni_{0.08}O_3$ | −1.0% |
| 1-10 | $Y_{1.24}Tb_{0.36}Cr_{0.2}Mn_{0.11}Ni_{0.09}O_3$ | −2.4% |
| 1-11 | $Y_{1.24}Tb_{0.36}Cr_{0.2}Mn_{0.1}Ni_{0.1}O_3$ | −1.0% |
| 1-12 | $Y_{1.24}Tb_{0.36}Cr_{0.2}Mn_{0.09}Ni_{0.11}O_3$ | −0.3% |
| 1-13 | $Y_{1.24}Tb_{0.36}Cr_{0.2}Mn_{0.08}Ni_{0.12}O_3$ | −0.2% |
| 1-14 | $Y_{1.24}Tb_{0.36}Cr_{0.2}Mn_{0.07}Ni_{0.13}O_3$ | −0.1% |

This example shows that the stability of a thermistor can be significantly improved if a part of the manganese content of the ceramic is replaced with nickel.

EXAMPLE 2 AND COMPARATIVE EXAMPLE 2

Likewise to the procedure as described for example 1, a series of thermistors was made based on the composition $Y_{1.24}Tb_{0.36}Cr_{0.2}Mn_{0.2}O_3$, in which Mn was progressively replaced by Co.

All samples provided a mean particle size below 2 μm.

The constitution of the single samples as well as their relative change in $\rho_{25}$ with respect to the as fired value, i.e. their drift, is summarized for the single compositions in Table 2.

TABLE 2

| Example | Composition | Drift |
|---|---|---|
| Comparative Example 2 | $Y_{1.24}Tb_{0.36}Cr_{0.2}Mn_{0.2}O_3$ | −46.4% |
| 2-1 | $Y_{1.236}Tb_{0.359}Cr_{0.199}Mn_{0.198}Co_{0.008}O_3$ | −27.0% |
| 2-2 | $Y_{1.231}Tb_{0.357}Cr_{0.199}Mn_{0.197}Co_{0.016}O_3$ | −17.3% |
| 2-3 | $Y_{1.227}Tb_{0.356}Cr_{0.198}Mn_{0.195}Co_{0.024}O_3$ | −10.6% |
| 2-4 | $Y_{1.222}Tb_{0.355}Cr_{0.197}Mn_{0.194}Co_{0.032}O_3$ | −6.1% |
| 2-5 | $Y_{1.218}Tb_{0.354}Cr_{0.196}Mn_{0.193}Co_{0.039}O_3$ | −3.4% |
| 2-6 | $Y_{1.24}Tb_{0.36}Cr_{0.2}Mn_{0.15}Co_{0.05}O_3$ | −1.2% |
| 2-7 | $Y_{1.24}Tb_{0.36}Cr_{0.2}Mn_{0.13}Co_{0.07}O_3$ | 0.2% |
| 2-8 | $Y_{1.24}Tb_{0.36}Cr_{0.2}Mn_{0.11}Co_{0.09}O_3$ | 0.4% |
| 2-9 | $Y_{1.24}Tb_{0.36}Cr_{0.2}Mn_{0.09}Co_{0.11}O_3$ | 0.2% |
| 2-10 | $Y_{1.24}Tb_{0.36}Cr_{0.2}Mn_{0.07}Co_{0.13}O_3$ | 0.4% |

This example shows that the stability of a thermistor can be significantly improved if a part of the manganese content of the ceramic is replaced with cobalt.

EXAMPLE 3 AND COMPARATIVE EXAMPLE 3

Likewise to the procedure as described for example 1, a series of thermistors was made based on the composition $Y_{1.24}Tb_{0.30}Cr_{0.2}Mn_{0.2}O_3$, in which Mn was progressively replaced by Cu.

All samples provided a mean particle size below 2 μm.

The constitution of the single samples as well as their relative change in $\rho_{25}$ with respect to the as fired value, i.e. their drift, is summarized for the single compositions in Table 3.

TABLE 3

| Example | Composition | Drift |
|---|---|---|
| Comparative Example 3 | $Y_{1.24}Tb_{0.36}Cr_{0.2}Mn_{0.2}O_3$ | −46.7% |
| 3-1 | $Y_{1.234}Tb_{0.358}Cr_{0.199}Mn_{0.198}Cu_{0.001}O_3$ | −18.3% |
| 3-2 | $Y_{1.236}Tb_{0.359}Cr_{0.199}Mn_{0.198}Cu_{0.008}O_3$ | −22.3% |
| 3-3 | $Y_{1.237}Tb_{0.359}Cr_{0.199}Mn_{0.199}Cu_{0.006}O_3$ | −25.5% |
| 3-4 | $Y_{1.238}Tb_{0.359}Cr_{0.2}Mn_{0.199}Cu_{0.004}O_3$ | −31.5% |
| 3-5 | $Y_{1.239}Tb_{0.36}Cr_{0.2}Mn_{0.2}Cu_{0.002}O_3$ | −38.3% |
| 3-6 | $Y_{1.24}Tb_{0.36}Cr_{0.2}Mn_{0.19}Cu_{0.01}O_3$ | −9.4% |
| 3-7 | $Y_{1.24}Tb_{0.36}Cr_{0.2}Mn_{0.186}Cu_{0.014}O_3$ | −6.5% |
| 3-8 | $Y_{1.24}Tb_{0.36}Cr_{0.2}Mn_{0.182}Cu_{0.018}O_3$ | −4.9% |
| 3-9 | $Y_{1.24}Tb_{0.36}Cr_{0.2}Mn_{0.178}Cu_{0.022}O_3$ | −4.3% |
| 3-10 | $Y_{1.24}Tb_{0.36}Cr_{0.2}Mn_{0.174}Cu_{0.026}O_3$ | −2.5% |
| 3-11 | $Y_{1.24}Tb_{0.36}Cr_{0.2}Mn_{0.17}Cu_{0.03}O_3$ | −0.6% |

This example shows that the stability of a thermistor can be significantly improved if a part of the manganese content of the ceramic is replaced with copper.

EXAMPLE 4

Likewise to the procedure as described for example 1, a series of thermistors was made based on the composition $Y_{1.24}Tb_{0.36}Cr_{0.2}Mn_{0.2}O_3$. While one series had a higher Cr content, the other had a lower Cr content than this composition. In both series the Mn was progressively replaced by Ni.

All samples provided a mean particle size below 2 μm.

The constitution of the single samples as well as their relative change in $\rho_{25}$ with respect to the as fired value, i.e. their drift, is summarized for the single compositions in Table 4.

TABLE 4

| Example | Composition | Drift |
|---|---|---|
| 4-1 | $Y_{1.24}Tb_{0.36}Cr_{0.22}Mn_{0.15}Ni_{0.03}O_3$ | −2.8% |
| 4-2 | $Y_{1.24}Tb_{0.36}Cr_{0.22}Mn_{0.136}Ni_{0.044}O_3$ | −1.1% |
| 4-3 | $Y_{1.24}Tb_{0.36}Cr_{0.22}Mn_{0.122}Ni_{0.058}O_3$ | 0.3% |
| 4-4 | $Y_{1.24}Tb_{0.36}Cr_{0.22}Mn_{0.108}Ni_{0.072}O_3$ | −0.1% |
| 4-5 | $Y_{1.24}Tb_{0.36}Cr_{0.22}Mn_{0.094}Ni_{0.086}O_3$ | −0.7% |
| 4-6 | $Y_{1.24}Tb_{0.36}Cr_{0.22}Mn_{0.08}Ni_{0.1}O_3$ | 0.7% |
| 4-7 | $Y_{1.24}Tb_{0.36}Cr_{0.18}Mn_{0.18}Ni_{0.04}O_3$ | −0.3% |
| 4-8 | $Y_{1.24}Tb_{0.36}Cr_{0.18}Mn_{0.164}Ni_{0.056}O_3$ | 0.5% |
| 4-9 | $Y_{1.24}Tb_{0.36}Cr_{0.18}Mn_{0.148}Ni_{0.072}O_3$ | 0.9% |
| 4-10 | $Y_{1.24}Tb_{0.36}Cr_{0.18}Mn_{0.132}Ni_{0.088}O_3$ | −0.4% |
| 4-11 | $Y_{1.24}Tb_{0.36}Cr_{0.18}Mn_{0.116}Ni_{0.104}O_3$ | −0.8% |
| 4-12 | $Y_{1.24}Tb_{0.36}Cr_{0.18}Mn_{0.1}Ni_{0.12}O_3$ | 3.8% |

This example shows that the stability of a thermistor can be significantly improved if a part of the manganese content of the ceramic is replaced with nickel, wherein a slight difference in the chromium content does not significantly influence the stability.

EXAMPLE 5 AND COMPARATIVE EXAMPLE 5

Likewise to the procedure as described for example 1, a series of thermistors was made based on the composition $Y_{1.24}Tb_{0.36}Mn_{0.4}O_3$, in which Mn was progressively replaced by nickel.

All samples provided a mean particle size below 2 μm.

The constitution of the single samples as well as their relative change in $\rho_{25}$ with respect to the as fired value, i.e. their drift, is summarized for the single compositions in Table 5.

TABLE 5

| Example | Composition | Drift |
|---|---|---|
| Comparative Example 5 | $Y_{1.24}Tb_{0.36}Mn_{0.4}O_3$ | n.m. |
| 5-1 | $Y_{1.24}Tb_{0.36}Mn_{0.37}Ni_{0.03}O_3$ | 4.1% |
| 5-2 | $Y_{1.24}Tb_{0.36}Mn_{0.34}Ni_{0.06}O_3$ | 4.4% |
| 5-3 | $Y_{1.24}Tb_{0.36}Mn_{0.31}Ni_{0.09}O_3$ | 6.8% |
| 5-4 | $Y_{1.24}Tb_{0.36}Mn_{0.28}Ni_{0.12}O_3$ | 11.2% |
| 5-5 | $Y_{1.24}Tb_{0.36}Mn_{0.25}Ni_{0.15}O_3$ | 20.7% |
| 5-6 | $Y_{1.24}Tb_{0.36}Mn_{0.25}Ni_{0.15}O_3$ | 14.6% |
| 5-7 | $Y_{1.24}Tb_{0.36}Mn_{0.22}Ni_{0.18}O_3$ | 15.8% |
| 5-8 | $Y_{1.24}Tb_{0.36}Mn_{0.19}Ni_{0.21}O_3$ | 2.2% |
| 5-9 | $Y_{1.24}Tb_{0.36}Mn_{0.16}Ni_{0.24}O_3$ | −39.0% | n.m. not measurable

The composition of the comparative example 5 could not be measured with standard equipment, because the $\rho_{25}$ was too high. However, it can be seen from the above Tables 1, 2 and 3 that the drift of materials with-out Ni is always around −40%. Thus, the examples 5-1 to 5-9 show that the stability of a thermistor can be improved by adding nickel even if the chromium content is zero.

EXAMPLE 6

Likewise to the procedure as described for example 1, a series of thermistors was made based on the composition $Y_{1.24}Tb_{0.36}Mn_{0.264}Ni_{0.136}O_3$, in which Mn and Ni were progressively replaced by chromium, while the Ni/Mn ration was kept constant.

All samples provided a mean particle size below 2 μm.

The constitution of the single samples as well as their relative change in $\rho_{25}$ with respect to the as fired value, i.e. their drift, is summarized for the single compositions in Table 6.

TABLE 6

| Example | Composition | Drift |
|---|---|---|
| 6-1 | $Y_{1.24}Tb_{0.36}Mn_{0.264}Ni_{0.136}O_3$ | 20.1% |
| 6-2 | $Y_{1.24}Tb_{0.36}Cr_{0.04}Mn_{0.238}Ni_{0.122}O_3$ | 19.3% |
| 6-3 | $Y_{1.24}Tb_{0.36}Cr_{0.08}Mn_{0.211}Ni_{0.109}O_3$ | 12.3% |
| 6-4 | $Y_{1.24}Tb_{0.36}Cr_{0.12}Mn_{0.185}Ni_{0.095}O_3$ | 11.1% |
| 6-5 | $Y_{1.24}Tb_{0.36}Cr_{0.16}Mn_{0.158}Ni_{0.082}O_3$ | 4.0% |
| 6-6 | $Y_{1.24}Tb_{0.36}Cr_{0.2}Mn_{0.132}Ni_{0.068}O_3$ | 0.2% |

This example shows that the stability of a thermistor is improved if the composition contains chromium.

EXAMPLE 7

Likewise to the procedure as described for example 1, a series of thermistors was made based on the composition $Y_{1.6}Cr_{0.2}Mn_{0.132}Ni_{0.068}O_3$, in which Y was progressively replaced by Dy.

All samples provided a mean particle size below 2 μm.

The constitution of the single samples as well as their relative change in $\rho_{25}$ with respect to the as fired value, i.e. their drift, is summarized for the single compositions in Table 7.

TABLE 7

| Example | Composition | Drift |
|---|---|---|
| 7-1 | $Y_{1.6}Cr_{0.2}Mn_{0.132}Ni_{0.068}O_3$ | −0.6% |
| 7-2 | $Y_{1.28}Dy_{0.32}Cr_{0.2}Mn_{0.132}Ni_{0.068}O_3$ | −0.1% |
| 7-3 | $Y_{0.96}Dy_{0.64}Cr_{0.2}Mn_{0.132}Ni_{0.068}O_3$ | 0.1% |

TABLE 7-continued

| Example | Composition | Drift |
|---|---|---|
| 7-4 | $Y_{0.64}Dy_{0.96}Cr_{0.2}Mn_{0.132}Ni_{0.068}O_3$ | 0.0% |
| 7-5 | $Y_{0.32}Dy_{1.28}Cr_{0.2}Mn_{0.132}Ni_{0.068}O_3$ | 0.0% |
| 7-6 | $Dy_{1.6}Cr_{0.2}Mn_{0.132}Ni_{0.068}O_3$ | −0.3% |

All compositions showed a good stability.

EXAMPLE 8 AND COMPARATIVE EXAMPLE 8

Likewise to the procedure as described for example 1, a series of thermistors was made based on the composition $Er_{1.6}Cr_{0.2}Mn_{0.2}O_3$, in which Mn was progressively replaced by Ni.

All samples provided a mean particle size below 2 μm.

The constitution of the single samples as well as their relative change in pts with respect to the as fired value, i.e. their drift, is summarized for the single compositions in Table 8.

TABLE 8

| Example | Composition | Drift |
|---|---|---|
| Comparative Example 8 | $Er_{1.6}Cr_{0.2}Mn_{0.2}O_3$ | −9.7% |
| 8-1 | $Er_{1.6}Cr_{0.2}Mn_{0.18}Ni_{0.02}O_3$ | −1.6% |
| 8-2 | $Er_{1.6}Cr_{0.2}Mn_{0.16}Ni_{0.04}O_3$ | −0.9% |
| 8-3 | $Er_{1.6}Cr_{0.2}Mn_{0.14}Ni_{0.06}O_3$ | −1.2% |
| 8-4 | $Er_{1.6}Cr_{0.2}Mn_{0.12}Ni_{0.08}O_3$ | −2.8% |
| 8-5 | $Er_{1.6}Cr_{0.2}Mn_{0.1}Ni_{0.1}O_3$ | −3.9% |

This example shows that the stability of a thermistor can be significantly improved if a part of the manganese content of the ceramic is replaced with nickel and that Er is a suitable element for the component Re.

EXAMPLE 9 AND COMPARATIVE EXAMPLE 9

Likewise to the procedure as described for example 1, a series of thermistors was made based on the composition $Er_{1.6}Cr_{0.2}Mn_{0.2}O_3$, in which Mn was progressively replaced by Mg.

All samples provided a mean particle size below 2 μm.

The constitution of the single samples as well as their relative change in $\rho_{25}$ with respect to the as fired value, i.e. their drift, is summarized for the single compositions in Table 9.

TABLE 9

| Example | Composition | Drift |
|---|---|---|
| Comparative Example 9 | $Er_{1.6}Cr_{0.2}Mn_{0.2}O_3$ | −12.0% |
| 9-1 | $Er_{1.6}Cr_{0.2}Mn_{0.18}Mg_{0.02}O_3$ | −4.5% |
| 9-2 | $Er_{1.6}Cr_{0.2}Mn_{0.16}Mg_{0.04}O_3$ | −1.9% |
| 9-3 | $Er_{1.6}Cr_{0.2}Mn_{0.14}Mg_{0.06}O_3$ | −0.5% |
| 9-4 | $Er_{1.6}Cr_{0.2}Mn_{0.12}Mg_{0.08}O_3$ | 0.0% |
| 9-5 | $Er_{1.6}Cr_{0.2}Mn_{0.1}Mg_{0.1}O_3$ | −0.8% |

This example shows that the stability of a thermistor can be significantly improved if a part of the manganese content of the ceramic is replaced with magnesium.

EXAMPLE 10 AND COMPARATIVE EXAMPLE 10

Likewise to the procedure as described for example 1, a series of thermistors was made based on the composition $Er_{1.6}Cr_{0.2}Mn_{0.2}O_3$, in which Er was progressively replaced by Ca or by Ca and Ni.

All samples provided a mean particle size below 2 μm.

The constitution of the single samples as well as their relative change in $\rho_{25}$ with respect to the as fired value, i.e. their drift, is summarized for the single compositions in Table 10.

TABLE 10

| Example | Composition | Drift |
|---|---|---|
| Com. Ex. 10-1 | $Er_{1.6}Cr_{0.2}Mn_{0.2}O_3$ | −23.8% |
| Com. Ex. 10-2 | $Er_{1.58}Ca_{0.02}Cr_{0.2}Mn_{0.2}O_3$ | −2.8% |
| 10-1 | $Er_{1.58}Ca_{0.02}Cr_{0.2}Mn_{0.18}Ni_{0.02}O_3$ | −1.4% |
| Com. Ex. 10-3 | $Er_{1.56}Ca_{0.04}Cr_{0.2}Mn_{0.2}O_3$ | −5.7% |
| 10-2 | $Er_{1.56}Ca_{0.04}Cr_{0.2}Mn_{0.18}Ni_{0.02}O_3$ | −1.9% |
| Com. Ex. 10-4 | $Er_{1.54}Ca_{0.06}Cr_{0.2}Mn_{0.2}O_3$ | −8.2% |
| 10-3 | $Er_{1.54}Ca_{0.06}Cr_{0.2}Mn_{0.18}Ni_{0.02}O_3$ | −2.3% |

Com. Ex.: Comparative Example

This example shows that Ca additions alone improve the stability of a thermistor, whereas the further addition of Ni to these materials significantly further improves the stability of the thermistor by a factor of more than 2.

After the sintering regime applied to those samples the grain size was in all cases less than 1 μm. Therefore, the improvement in the stability is not due to the larger grain size brought about the additions, but to the change of the intrinsic properties of the material.

EXAMPLE 11

Likewise to the procedure as described for example 1, a series of thermistors was made based on the composition $Y_{1.24}Tb_{0.36}Cr_{0.2}Mn_{0.08}Ni_{0.12}O_3$, in which the corundum phase was varied.

All samples provided a mean particle size below 2 μm.

The constitution of the single samples as well as their relative change in $\rho_{25}$ with respect to the as fired value, i.e. their drift, is summarized for the single compositions in Table 11.

TABLE 11

| Example | Composition | Drift |
|---|---|---|
| 11-1 | $Y_{1.24}Tb_{0.36}Cr_{0.2}Mn_{0.08}Ni_{0.12}O_3$ | 1.6% |
| 11-2 | $Y_{1.275}Tb_{0.385}Cr_{0.17}Mn_{0.069}Ni_{0.101}O_3$ | 0.9% |
| 11-3 | $Y_{1.31}Tb_{0.41}Cr_{0.14}Mn_{0.057}Ni_{0.083}O_3$ | −1.6% |

This example shows that increasing the corundum phase does not influence the stability. The perovskite ratios of these samples were 0.4, 0.34 and 0.28, respectively.

EXAMPLE 12 AND COMPARATIVE EXAMPLE 12

Likewise to the procedure as described for example 1, two thermistors were made based on the composition $Y_{1.24}La_{0.36}Cr_{0.2}Mn_{0.2}O_3$, in which Mn was partially replaced by Ni.

All samples provided a mean particle size below 2 μm.

The constitution of the single samples as well as their relative change in $\rho_{25}$ with respect to the as fired value, i.e. their drift, is summarized for the single compositions in Table 12.

TABLE 12

| Example | Composition | Drift |
|---|---|---|
| Comparative Example 12 | $Y_{1.24}La_{0.36}Cr_{0.2}Mn_{0.2}O_3$ | −66.0% |
| 12-1 | $Y_{1.24}La_{0.36}Cr_{0.2}Mn_{0.13}Ni_{0.07}O_3$ | +0.53% |

This example shows that the stability of a thermistor can be significantly improved if a part of the manganese content of the ceramic is replaced with nickel and that La is a suitable rare earth metal in compositions according to the general formula (I).

The invention claimed is:

1. A thermistor based on a composition having the general formula (I):

$$Re_{2-x-y}Cr_aMn_bM_cE_yO_z \quad (I)$$

wherein
Re is a rare earth metal or a mixture of two or more rare earth metals,
M is a metal selected from the group consisting of nickel, cobalt, copper, magnesium and mixtures thereof,
E is a metal selected from the group consisting of calcium, strontium, barium and mixtures thereof,
x is the sum of a+b+c and is a number between 0.1 and 1, and
the relative ratio of the molar fractions a, b and c is in an area bounded by points A, B, C and D in a ternary diagram, wherein
point A is, if y<0.006, at (Cr=0.00, Mn=0.93+10−y, M=0.07−10−y), and,
if y≧0.006, at (Cr=0.00, Mn=0.99, M=0.01),
point B is, if y<0.006, at (Cr=0.83, Mn=0.10+10−y, M=0.07−10−y), and,
if y≧0.006, at (Cr=0.83, Mn=0.16, M=0.01),
point C is at (Cr=0.50, Mn=0.10, M=0.40) and
point D is at (Cr=0.00, Mn=0.51, M=0.49),
y is a number from 0 to 0.5x, and
z is a number from 2.5 to 3.5.
2. A thermistor according to claim 1,
wherein
the relative ratio of the molar fractions a, b and c is in an area bounded by points E, F, G, C and H in a ternary diagram, wherein
point E is, if y<0.006, at (Cr=0.35, Mn=0.58+10−y, M=0.07−10−y), and,
if y≧0.006, at (Cr=0.35, Mn=0.64, M=0.01),
point F is, if y<0.006, at (Cr=0.65, Mn=0.28+10−y, M=0.07−10−y), and,
if y≧0.006, at (Cr=0.65, Mn=0.34, M=0.01),
point G is at (Cr=0.65, Mn=0.10, M=0.25),
point C is at (Cr=0.50, Mn=0.10, M=0.40) and
point H is at (Cr=0.35, Mn=0.22, M=0.43).
3. A thermistor according to claim 1,
wherein
Re is selected from the group consisting of Y, Tb, Dy, Er, La and combinations thereof.
4. A thermistor according to claim 1,
wherein
Re is Y, Dy, Er, La, a mixture of Y and Dy or a mixture of Y and Tb.
5. A thermistor according to claim 1,
wherein
Re is a mixture of Y and Tb, wherein the ratio of the molar fraction of Y to the molar fraction of Tb is between 5:1 and 1:1.

6. A thermistor according to claim 5, wherein the ratio of the molar fraction of Y to the molar fraction of Tb is between 4.5:1 and 3:1.

7. A thermistor according to claim 6, wherein the ratio of the molar fraction of Y to the molar fraction of Tb is about 3.5:1.

8. A thermistor according to claim 1,
wherein
x is a number between 0.2 and 0.6.

9. A thermistor according to claim 8,
wherein x is a number between 0.3 and 0.5.

10. A thermistor according to claim 9,
wherein x is a number between 0.35 and 0.45.

11. A thermistor according to claim 10, wherein x is 0.4.

12. A thermistor according to claim 1,
wherein
the relative ratio of the molar fractions a, b and c is a=0.4-0.6:b=0.23-0.43:c=0.08-0.28.

13. A thermistor according claim 12,
wherein
the relative ratio of the molar fractions a, b and c is a=0.45-0.55:b=0.28-0.38:c=0.12-0.22.

14. A thermistor according to claim 13,
wherein
the relative ratio of the molar fractions a, b and c is a=0.5:b=0.33:c=0.17.

15. A thermistor according to claim 1,
wherein
M is Ni.

16. A thermistor according to claim 1,
wherein
Re is Y, Dy, Er, La, a mixture of Y and Dy or a mixture of Y and Tb and M is Ni.

17. A thermistor according to claim 1,
wherein
z is a number between 2.75 and 3.25.

18. A thermistor according to claim 17,
wherein z is a number between 2.90 and 3.10.

19. A thermistor according to claim 18, wherein z is a number between 2.95 and 3.05.

20. A thermistor according to claim 19, wherein z is a 3.00.

21. A thermistor according to claim 1,
wherein
y is a number between 0.01 and 0.2, preferably between 0.02 and 0.1, more preferably between 0.03 and 0.06 and most preferably of 0.05.

22. A thermistor according to claim 21, wherein y is a number between 0.02 and 0.1.

23. A thermistor according to claim 22, wherein y is a number between 0.03 and 0.06.

24. A thermistor according to claim 23, wherein y is 0.05.

25. A thermistor according to claim 21,
wherein
E is calcium.

26. A thermistor according to claim 21,
wherein
c is at least 0.01.

27. A thermistor according to claim 21,
wherein
M is nickel, cobalt or copper.

28. A thermistor according to claim 1,
wherein
Re is Er.

29. A thermistor according to claim 28,
wherein
the composition has the general formula:

$$Er_i Ca_j Cr_k Mn_l Ni_s O_m \quad (II)$$

wherein
is a number between 1.4 and 1.6,
j is a number between 0.02 and 0.2,
k is a number between 0.15 and 0.25,
l is a number between 0.14 and 0.24,
s is at least 0.01 and
m is 3.00.

30. A thermistor according to claim 29, wherein
k is a 0.2, and l is 0.19.

31. A thermistor according to claim 29,
wherein
the composition has the formula (III):

$$Er_{1.55}Ca_{0.05}Cr_{0.2}Mn_{0.19}Ni_{0.01}O_3 \quad (III).$$

32. A thermistor according to claim 1,
wherein
y is 0.

33. A thermistor according to claim 32,
wherein
the composition has the general formula (IV):

$$Re_{1.6}Cr_{0.2}Mn_b Ni_c O_3 \quad (IV)$$

wherein Re is Y, Dy, Er, La, a mixture of Y and Dy or a mixture of Y and Tb, b is a number between 0.12 and 0.14 and c is a number between 0.06 and 0.07.

34. A thermistor according to claim 33,
wherein
Re is a mixture of Y and Tb.

35. A thermistor according to claim 33,
wherein
the composition has the general formula (V):

$$Y_n Tb_p Cr_{0.2}Mn_b Ni_c O_3 \quad (V)$$

wherein n is the molar fraction of Y and is a number between 1.2 and 1.3, p is the molar fraction of Tb and is a number between 0.3 and 0.4, b is a number between 0.12 and 0.14 and c is a number between 0.06 and 0.07.

36. A thermistor according to claim 35,
wherein
the composition has the general formula (VI):

$$Y_{1.24}Tb_{0.36}Cr_{0.2}Mn_{0.132}Ni_{0.068}O_3 \quad (VI).$$

37. A thermistor according to claim 1,
wherein
the composition comprises a corundum phase and a perovskite phase.

38. A thermistor according to claim 37,
wherein
the molar fraction of the corundum phase is between 0.4 and 0.8, and the molar fraction of the perovskite phase is between 0.2 and 0.6, based on the total composition.

39. A thermistor according to claim 38, wherein the molar fraction of the corundum phase is between 0.5 and 0.7, and the molar fraction of the perovskite phase is between 0.3 and 0.5 based on the total composition.

40. A thermistor according to claim 38,
wherein
the molar fraction of the corundum phase is 0.6 and the molar fraction of the perovskite phase is 0.4 based on the total composition.

41. A thermistor according to claim 37, wherein
the average particle size of the composition of the corundum phase is less than 3 μm.

42. A thermistor according to claim 41, wherein the average particle size of the composition of the corundum phase is less than 2 μm.

43. A thermistor according to claim 42, wherein the average particle size of the composition of the corundum between 1.5 and 1.9 μm.

44. A thermistor according to claim 37, wherein
the average particle size of the composition of the perovskite phase is less than 3 μm.

45. A thermistor according to claim 44, wherein the average particle size of the composition of the perovskite phase is less than 2 μm.

46. A thermistor according to claim 45, wherein the average particle size of the composition of the perovskite phase is between 1.0 and 1.9 μm.

47. A thermistor according to claim 1, wherein
the average particle size of the composition with the general formula (I) of the thermistor is less than 3 μm.

48. A thermistor according to claim 47, wherein the average particle size of the composition with the general formula (I) of the thermistor is less than 2 μm.

49. A thermistor according to claim 48, wherein the average particle size of the composition with the general formula (I) of the thermistor is between 1.0 and 1.5 μm.

50. A thermistor according to claim 1, wherein
the resistivity of the thermistor at 25° C. is between 2 and 2,000 kΩmm.

51. A thermistor according to claim 50, wherein the resistivity of the thermistor at 25° C. is between 500 and 1,500 kΩmm.

52. A thermistor according to claim 51, wherein the resistivity of the thermistor at 25° C. is between 1,000 and 1,200 kΩmm.

53. A thermistor according to claim 1, wherein
the $B_{25/85}$ value of the thermistor is between 2,000 and 4,000 K.

54. A method for producing a thermistor which is based on a composition having the general formula (I):

$$Re_{2-x-y}Cr_aMn_bM_cE_yO_z \qquad (I)$$

wherein
Re is a rare earth metal or a mixture of two or more rare earth metals,
M is a metal selected from the group consisting of nickel, cobalt, copper, magnesium and mixtures thereof,
E is a metal selected from the group consisting of calcium, strontium, barium and mixtures thereof,
x is the sum of a+b+c and is a number between 0.1 and 1, and
the relative ratio of the molar fractions a, b and c is in an area bounded by points A, B, C and D in a ternary diagram, wherein
point A is, if y<0.006, at (Cr=0.00, Mn=0.93+10−y, M=0.07-10−y), and,
  if y≧0.006, at (Cr=0.00, Mn=0.99, M=0.01),
point B is, if y<0.006, at (Cr=0.83, Mn=0.10+10−y, M=0.07-10−y), and,
  if y≧0.006, at (Cr=0.83, Mn=0.16, M=0.01),
point C is at (Cr=0.50, Mn=0.10, M=0.40) and
point D is at (Cr=0.00, Mn=0.51, M=0.49),
y is a number between 0 and 0.5−x, and
z is a number between 2.5 and 3.5, said method comprising the steps of:
i) mixing at least one rare earth metal oxide with manganese oxide and with at least one metal oxide selected from the group consisting of nickel oxide, cobalt oxide, copper oxide and magnesium oxide, and, optionally with at least one compound selected from the group consisting of calcium carbonate, strontium carbonate, barium carbonate and mixtures thereof, and/or, optionally, with chromium oxide,
ii) milling the mixture obtained in step i),
iii) forming the mixture obtained in step ii) into an article having a desired shape and
iv) sintering the article.

\* \* \* \* \*

UNITED STATES PATENT AND TRADEMARK OFFICE
CERTIFICATE OF CORRECTION

PATENT NO. : 8,362,869 B2  
APPLICATION NO. : 12/808635  
DATED : January 29, 2013  
INVENTOR(S) : Poulain et al.

Page 1 of 1

It is certified that error appears in the above-identified patent and that said Letters Patent is hereby corrected as shown below:

In the Claims

In Column 12, line 31, Claim 1 please replace "10–y" with -- 10•y --

In Column 12, line 32, Claim 1 please replace "10–y" with -- 10•y --

In Column 12, line 34, Claim 1 please replace "10–y" with -- 10•y --

In Column 12, line 35, Claim 1 please replace "10–y" with -- 10•y --

In Column 12, line 46, Claim 2 please replace "10–y" with -- 10•y --

In Column 12, line 47, Claim 2 please replace "10–y" with -- 10•y --

In Column 12, line 49, Claim 2 please replace "10–y" with -- 10•y --

In Column 12, line 50, Claim 2 please replace "10–y" with -- 10•y --

In Column 14, line 7, Claim 29 please replace "is a number between 1.4 and 1.6," with -- i is a number between 1.4 and 1.6, --

In Column 16, line 17, Claim 54 please replace "10–y" with -- 10•y --

In Column 16, line 18, Claim 54 please replace "10–y" with -- 10•y --

In Column 16, line 20, Claim 54 please replace "10–y" with -- 10•y --

In Column 16, line 21, Claim 54 please replace "10–y" with -- 10•y --

Signed and Sealed this  
Thirteenth Day of May, 2014

Michelle K. Lee  
*Deputy Director of the United States Patent and Trademark Office*